US008127680B2

(12) United States Patent
Sugimoto

(10) Patent No.: US 8,127,680 B2
(45) Date of Patent: Mar. 6, 2012

(54) METHOD AND APPARATUS OF CONTROLLING QUALITY OF PRINTED IMAGE FOR COLOR PRINTING PRESS

(75) Inventor: Hiroshi Sugimoto, Fuchu (JP)

(73) Assignee: Ryobi Ltd., Hiroshima-Ken (JP)

( * ) Notice: Subject to any disclaimer, the term of this patent is extended or adjusted under 35 U.S.C. 154(b) by 486 days.

(21) Appl. No.: 12/363,544

(22) Filed: Jan. 30, 2009

(65) Prior Publication Data

US 2009/0188403 A1 Jul. 30, 2009

(30) Foreign Application Priority Data

Jan. 30, 2008 (JP) ................................ 2008-018529

(51) Int. Cl.
*B41F 31/02* (2006.01)
*B41F 33/14* (2006.01)
*G01J 3/46* (2006.01)

(52) U.S. Cl. ......................... 101/484; 101/365; 101/485

(58) Field of Classification Search .................. 101/365, 101/483, 484, 485, DIG. 47, DIG. 45; 382/112; 356/407

See application file for complete search history.

(56) References Cited

U.S. PATENT DOCUMENTS 4,967,379 A * 10/1990 Ott ............................... 382/112
5,068,810 A * 11/1991 Ott ............................... 382/112
5,182,721 A * 1/1993 Kipphan et al. .............. 382/112
5,333,069 A * 7/1994 Spence ......................... 358/517
6,389,968 B1 * 5/2002 Sugimoto et al. ............. 101/365
2008/0018918 A1 * 1/2008 Ozaki et al. .................... 358/1.9
2008/0127849 A1 * 6/2008 Sugimoto ..................... 101/484
2008/0216695 A1 * 9/2008 Ozaki et al. .................. 101/484
2009/0120315 A1 * 5/2009 Ochiai et al. ............... 101/450.1

FOREIGN PATENT DOCUMENTS

JP 3384769 12/2002

* cited by examiner

*Primary Examiner* — Judy Nguyen
*Assistant Examiner* — Leo T Hinze
(74) *Attorney, Agent, or Firm* — TIPS Group

(57) ABSTRACT

A method and an apparatus of the present invention is capable of matching an image of a printed matter with a desired image with high accuracy by adjusting tints even when tints change while printing. There are provided a measurement means that measures gray Lab values of a printed matter, a calculation means that calculates ΔL, Δa, and Δb that are differences between the measured Lab values and predetermined target gray Lab values, a first correction value calculation means that corrects Δa based on Δb, a second correction value calculation means that corrects ΔL based on a corrected value Δa1 that has been calculated by the first correction value calculation means, a halftone density difference calculation means that calculates halftone density differences of C, M, and Y based on Δb, Δa1 and ΔL1 obtained by correcting ΔL, an ink density difference conversion means that converts the calculated C, M, and Y halftone density differences into ink density differences, and an ink feed amount adjustment means that adjusts the ink feed amount for the ink fountain keys based on the ink density differences.

2 Claims, 7 Drawing Sheets

METHOD AND APPARATUS OF CONTROLLING QUALITY OF PRINTED IMAGE FOR COLOR PRINTING PRESS

CROSS REFERENCE TO RELATED APPLICATION

This application claims priority from Japanese Patent Application No. 2008-018529, which is incorporated herein by reference.

BACKGROUND OF THE INVENTION

1. Field of the Invention

The present invention relates to a method of controlling quality of a printed image and an apparatus of controlling quality of a printed image by controlling the ink feed amount of each of a plurality of basic colors of a color printing press.

2. Related Art

There has been known a color printing press including a plurality of printing units each provided with a plurality of ink fountains that respectively contain printing inks of a plurality of basic colors that are different from each other (typically four colors including three colors of Cyan (C), Magenta (M), and Yellow (Y), as well as Black (Bk)), and a plurality of ink fountain keys each aligned with each of the ink fountains in the lengthwise direction so as to adjust ink feed amounts from the corresponding ink fountains, wherein the plurality of inks of basic colors whose ink feed amounts are adjusted for the corresponding ink fountains using the ink fountain keys are respectively fed to a plurality of printing plates that are provided corresponding to the plurality of ink fountains, and a plurality of images of basic colors respectively formed with the plurality of inks of basic colors that have been fed are sequentially printed on a subject to be printed, thereby obtaining a printed matter on which a color print image is printed.

In each printing unit described above, in the middle way of feeding the ink fed from the ink fountain to the printing plate, a group of a number of ink rollers is provided between the ink fountain and the printing plate.

Accordingly, there is a case in which a portion of the ink on the printed matter that is carried to the next printing unit moves to the ink fountain via the group of ink rollers of this printing unit.

While each ink generally includes a color component of the other ink as turbidity, the turbidity degree adversely changes to a large degree if two inks become mixed by the other ink moving to the ink fountain via the group of ink rollers during printing operation is made in the manner as described above, or the color that has been matched prior to printing adversely changes during the printing if a transfer ratio of one ink to be printed onto another ink (ink trapping ratio) changes.

Thus, there has already been proposed a technique of adjusting feed amounts of the inks during printing, taking into account the main color component and the turbidity color component of each ink (cf. Japanese Patent No. 3384769, for example).

An ink feed amount adjustment apparatus of Japanese Patent No. 3384769 measures a density value of a color on a printed matter that has been printed and adjusts a feed amount of an ink for each ink fountain so as to match the measured value with a desired density value, but does not take into account an adjustment of tints or hues (color differences) at all. Therefore, there is a case in which the tints or hues of the colors do not match, leaving much to be improved.

SUMMARY OF THE INVENTION

The present invention is made in view of the above problems, and an object of the present invention is to provide a method of controlling quality of a printed image and an apparatus of controlling quality of a printed image for a color printing press, capable of matching an image on a printed matter with a desired image with high accuracy by adjusting tints or hues even when the tints or hues change during printing.

According to the present invention, there is provided a method of controlling quality of a printed image of a color printing press that prints a color print image on a subject to be printed by: adjusting ink feed amounts from a plurality of ink fountains using a plurality of ink fountain keys, the ink fountains respectively containing printing inks of a plurality of basic colors that are different from each other; supplying the inks of basic colors that have been adjusted for the corresponding ink fountain keys to a plurality of printing plates provided corresponding to the plurality of ink fountains; and sequentially printing a plurality of images of the basic colors on the subject to be printed, the images being formed respectively with the supplied inks of the plurality of basic colors, the method comprising the steps of measuring gray Lab values of a printed matter that has been printed; calculating $\Delta L$, $\Delta a$, and $\Delta b$ that are respectively differences between the measured Lab values and predetermined target gray Lab values; correcting $\Delta a$ based on $\Delta b$; thereafter correcting $\Delta L$ based on a corrected value $\Delta a1$ of $\Delta a$; calculating C, M, and Y halftone density differences, respectively, based on $\Delta b$, the corrected value $\Delta a1$ and a corrected value $\Delta L1$ obtained by correcting $\Delta L$; converting the calculated C, M, and Y halftone density differences into ink density differences, respectively; and adjusting the ink feed amounts for the corresponding plurality of ink fountain keys based on the converted ink density differences.

Alternatively, an apparatus of controlling quality of a printed image according to the present invention can be an apparatus of controlling quality of a printed image of a color printing press that includes a plurality of ink fountains respectively containing printing inks of a plurality of basic colors that are different from each other and a plurality of ink fountain keys for adjusting of ink amounts fed from the corresponding ink fountains, and that prints a color print image on a subject to be printed by supplying the inks of basic colors, whose feed amounts have been adjusted for the corresponding ink fountain keys, to a plurality of printing plates provided corresponding to the plurality of ink fountains; and sequentially printing a plurality of images of the basic colors on the subject to be printed, the images being formed respectively with the supplied inks of the plurality of basic colors, the apparatus comprising: a controlling unit that is provided with: a measurement means that measures gray Lab values of a printed matter that has been printed; a calculation means that calculates $\Delta L$, $\Delta a$, and $\Delta b$ that are respectively differences between the Lab values measured by the measurement means and predetermined target gray Lab values; a first correction value calculation means that corrects $\Delta a$ based on $\Delta b$; a second correction value calculation means that corrects $\Delta L$ based on a corrected value $\Delta a1$ that has been calculated by the first correction value calculation means; a halftone density difference calculation means that calculates C, M, and Y halftone density differences, respectively, based on $\Delta b$, the corrected value $\Delta a1$ and a corrected value $\Delta L1$ obtained by correcting $\Delta L$; an ink density difference conversion means that converts the C, M, and Y halftone density differences calculated by the calculation means into ink density differences, respectively; and an ink feed amount adjustment means that adjusts the ink feed amounts for the corresponding plurality of ink fountain keys based on the converted ink density differences.

In this manner, the tints or hues (color differences) are matched by measuring the gray Lab values of the printed matter that has been printed and adjusting the ink feed amounts based on ΔL, Δa, and Δb that are the differences between the measured gray Lab values and the target gray Lab values.

However, obtaining ΔL, Δa, and Δb that respectively are the differences between the two Lab values and adjusting the ink feed amounts at the same time based on the values of ΔL, Δa, and Δb causes a large variation in a solid ink density. The present inventors found this problem and conceived that matching the tints or hues while suppressing the variation in the solid ink density by correcting the values of ΔL, Δa, and Δb. In addition, the order, in which the correction of the values of ΔL, Δa, and Δb is made, is not arbitrary. Generally, Yellow is the color in which a color mixture (turbidity degree) is smallest out of Cyan, Magenta, and Yellow. First, Δb is corrected based on Yellow with small turbidity degree, and then Δa corresponding to Magenta is corrected. Then, by finally correcting ΔL based on the corrected value Δa1 of Δa, it is possible to gradually correct the values without the tints or hues largely deviating, and to ultimately approximate to the target values. As adjusting one color changes proportions of other colors that are mixed in the same color, adjusting simply based on the values of ΔL, Δa, and Δb can cause a large variation in color, and accurate color matching cannot be actually realized. In view of the above circumstances, a large variation in Yellow is suppressed while adjusting Magenta by using Δb (smallest difference), which corresponds to Yellow with the smallest turbidity degree, for correction of Δa that corresponds to Magenta. Further, large variations in Yellow and Magenta are suppressed while adjusting Cyan by using the corrected value Δa1 of Δa as the value to correct ΔL. In other words, by correcting Δa and ΔL for gradual color matching, the tints or hues of three colors of Yellow, Magenta, and Cyan in the printed matter to be printed can be matched with the target tints or hues with high accuracy.

Specifically, the correction of Δa is carried out by converting Δb into a Y halftone density difference for gray, and calculating a variation amount Δa' of Δa that has varied due to the conversion, the correction of ΔL is carried out by obtaining the corrected value Δa1 by adding the variation amount Δa' to Δa, and converting the corrected value Δa1 into an M halftone density difference for gray, the calculation of C, M, and Y halftone density differences is carried out by calculating a variation amount ΔL' of the Y halftone density difference and ΔL that have varied due to the conversion, obtaining the corrected value ΔL1 by adding the variation amount ΔL' to ΔL, converting the corrected value ΔL1 into C, M, and Y equivalent amount halftone densities for gray, setting the converted C, M, and Y equivalent amount halftone densities as C, M, and Y halftone density differences, calculating target halftone density values by adding actual measurement values of the C, M, and Y halftone densities to the C, M, and Y halftone density differences, and calculating the C, M, and Y halftone density differences by subtracting the target halftone density values from the actual measurement values of the C, M, and Y halftone densities, and the calculated C, M, and Y halftone density differences are converted into the ink density differences.

Alternatively, the apparatus according to the present invention can be such that the first correction value calculation means converts Δb into a Y halftone density difference for gray, calculates a variation amount Δa' of Δa that has varied due to the conversion, and calculates the corrected value Δa1 by adding the variation amount Δa' to Δa, the second correction value calculation means converts the corrected value Δa1 into an M halftone density difference for gray, calculates a variation amount ΔL' of the Y halftone density difference and ΔL that have varied due to the conversion, and calculates the corrected value ΔL1 by adding the variation amount ΔL' to ΔL, and the halftone density difference calculation means converts the corrected value ΔL1 into C, M, and Y equivalent amount halftone densities for gray, sets the converted C, M, and Y equivalent amount halftone densities as C, M, and Y halftone density differences, calculates target halftone density values by adding actual measurement values of the C, M, and Y halftone densities to the C, M, and Y halftone density differences, and calculates the C, M, and Y halftone density differences by subtracting the target halftone density values from the actual measurement values of the C, M, and Y halftone densities.

The tints or hues can be matched by measuring the gray Lab values for the printed matter that has, been printed, and adjusting the ink feed amounts based on the differences between the measured gray Lab values and the target gray Lab values. Moreover, by using Δb corresponding to Yellow with the least turbidity degree to the correction of Δa that corresponds to Magenta, and using the corrected value of Δa as the value to correct ΔL, it is possible to provide a method of controlling quality of a printed image for a color printing press and an apparatus of controlling quality of a printed image for a color printing press capable of accurately matching all of Cyan, Magenta, and Yellow to the target tints at a comparable level even when the tints change while printing.

DESCRIPTION OF THE PREFERRED EMBODIMENTS

Figure 1:
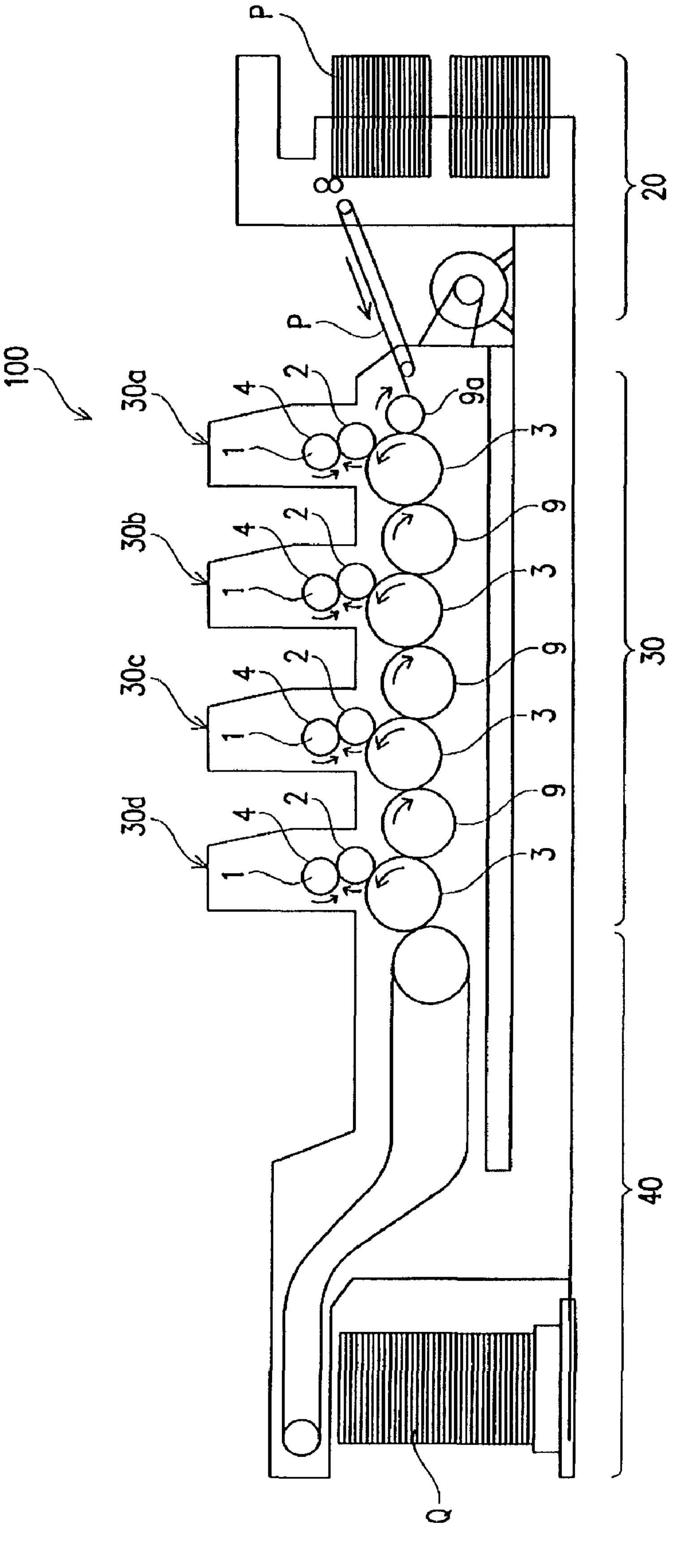
FIG. 1 is a diagram schematically showing a configuration of one example of a color printing press for realizing a method of controlling quality of a printed image for the color printing press.
Figure 3:
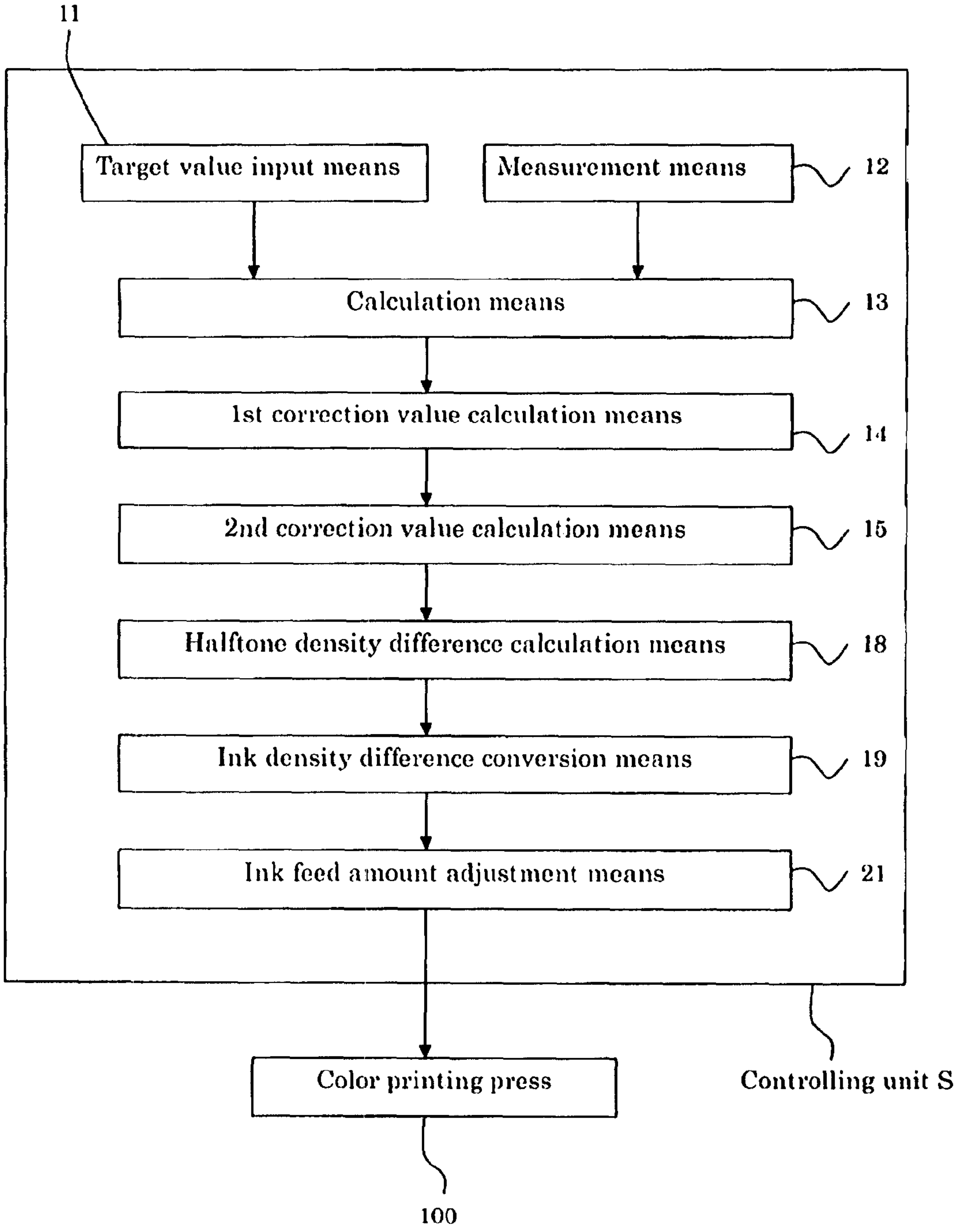
FIG. 3 is a block diagram showing a structure of a controlling unit of the present invention.

The following describes an embodiment according to the present invention with reference to the drawings. FIG. 1 shows a schematic configuration of one example of a color printing press 100 in one example of a color printing system that realizes a method of controlling quality of a printed image for a color printing press according to the present invention. The color printing system is provided with a controlling unit S as shown in FIG. 3 that will be described later, in addition to the color printing press 100 as described above.

As shown in FIG. 1, the color printing press 100 prints images in basic colors of C, M, Y, and Bk that are formed by printing inks of a plurality of basic colors that are different from each other, which are the inks of four basic colors of Cyan (C), Magenta (M), Yellow (Y), and Black (Bk) in this specification, sequentially on a subject to be printed P (printing paper in this specification), thereby printing a color print image onto the subject to be printed P. Further, the color printing press 100 is provided with a paper feeding section 20, a printing section 30, and a paper discharge section 40. The paper feeding section 20 is able to feed the subject to be printed P to the printing section 30. The printing section 30 is able to print on the printing paper P fed from the paper feeding section 20, and is provided with a plurality of printing units (in this specification, four printing units 30*a* to 30*d* with which images of basic colors of C, M, Y, and Bk are respectively formed). Further, the paper discharge section 40 is able to discharge a printed matter Q that has been printed by the printing section 30. In the printing press 100, the printing paper P is fed from the paper feeding section 20 to the printing section 30, the printing paper P that has been fed is then printed by each of the printing units 30*a* to 30*d* of the printing section 30, and the printed matter Q that has been printed is discharged through the paper discharge section 40.

Each of the printing units 30*a* to 30*d* of the printing section 30 is provided with a plate cylinder 1, a rubber blanket cylinder 2, and an impression cylinder 3 as a set of major components. Both of a reference numeral 9*a* of the printing unit 30*a* and a reference numeral 9 of the printing units 30*b*-30*d* represent a transfer cylinder.

In each of the printing units 30*a* to 30*d*, the plate cylinder 1 is provided with a plate 4 for printing. This plate is supplied with an ink and water, and the ink is transferred to the rubber blanket cylinder 2 in accordance with the plate. Then, the ink transferred to the rubber blanket cylinder 2 is further transferred to the printing paper P that is carried while being held between the rubber blanket cylinder 2 and the impression cylinder 3. In this manner, the printing paper P that has been fed from the paper feeding section 20 is printed by the plates 4 provided respectively for the plate cylinders 1. Each of the plates 4 here is able to, for example, print an image of one of the basic colors of C, M, Y, and Bk on the printing paper P with leaving a non-printing area, and print a color bar (not shown) in the non-printing area.

Each of the printing units 30*a* to 30*d* is provided with an ink feeding device 5, a pivotally moving device 70 (not shown in FIG. 1, see FIG. 2A that will be described later), and the group of ink rollers that are not shown in the drawings, in addition to the plate cylinder 1, the rubber blanket cylinder 2, and the impression cylinder 3 as described above.

Figure 2A:
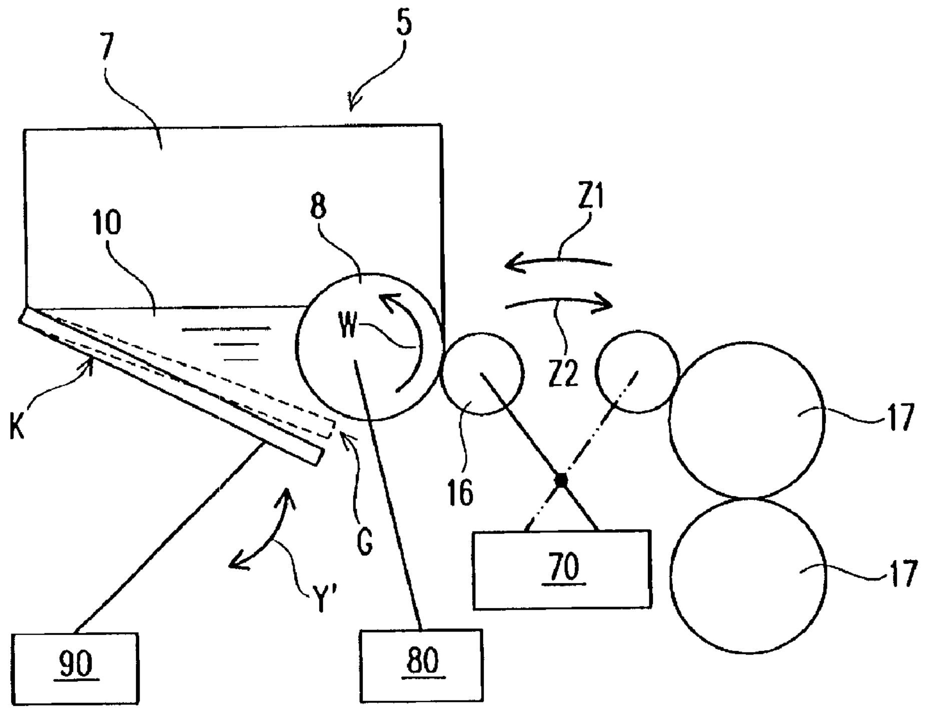
FIG. 2A is an enlarged view schematically showing a main portion and its periphery of an ink feeding device.
Figure 2B:
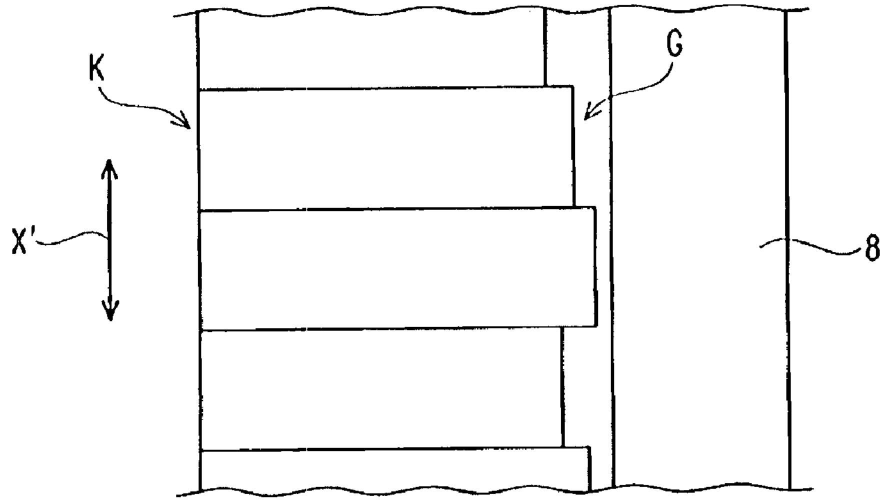
FIG. 2B is a partial view schematically showing, in an exaggerated manner, a gap between an ink fountain key and an ink fountain roller in the ink feeding device that will be described later.

FIG. 2A is an enlarged view schematically showing a main portion and its periphery of the ink feeding device 5, and FIG. 2B is a partial view schematically showing, in an exaggerated manner, a gap G between an ink fountain key K and an ink fountain roller 8 in the ink feeding device 5 that will be described later. The ink feeding device 5 is able to feed a printing ink 10 to the plate 4 of the plate cylinder 1 via the group of ink rollers that is not shown in the drawings.

Each ink feeding device 5 is, as shown in FIG. 2A, provided with an ink fountain 7, the ink fountain roller 8, a plurality of the ink fountain keys K, a roller driving device 80, and an ink fountain key transfer device 90.

Each ink fountain 7 is able to contain the printing ink 10, and is provided with the ink fountain roller 8 and the plurality of ink fountain keys K. The ink fountain roller 8 is rotatably provided at a bottom of the ink fountain 7, and connected to the roller driving device 80. The roller driving device 80 is configured to drive the ink fountain roller 8 to rotate in a predetermined direction (a counterclockwise direction W represented by the arrow in FIG. 2A). With this configuration, the ink fountain roller 8 is driven to rotate while making the printing ink 10 contained in the ink fountain 7 attach on its surface, thereby feeding the printing ink 10 on its surface to a feed roller 16. Any conventionally known device can be used as the roller driving device 80 as long as the device is capable of driving the ink fountain roller 8 to rotate, and therefore detailed explanation of a configuration and such of the roller driving device 80 is not given.

Each ink fountain key K is provided next to the ink fountain roller 8 along a direction that is along a roller axis of the ink fountain roller 8 and a width direction of the ink fountain key (a direction of an arrow X' in FIG. 2B), so as to be movable along a direction that traverses the width direction X' of the ink fountain key (a direction of an arrow Y' in FIG. 2A). The ink fountain key K is connected to the ink fountain key transfer device 90 so that the movement along the direction of the arrow Y' is allowed. Any conventionally known device can be used as the ink fountain key transfer device 90 as long as the device is capable of moving the ink fountain key K along the movement direction Y', and therefore detailed explanation of a configuration and such of the ink fountain key transfer device 90 is not given.

In the ink feeding device 5 shown in FIG. 2A, the printing ink 10 contained in the ink fountain 7 flows out through the gap G between the ink fountain roller 8 and the ink fountain key K, and is fed to the periphery surface of the rotating ink fountain roller 8. The gap G is adjustable by moving the ink fountain key K along the movement direction Y' using the ink fountain key transfer device 90. When the ink fountain key K moves farther from the ink fountain roller 8, the gap G becomes wider and an amount of the ink that flows out from the ink fountain 7 becomes greater, and when the ink fountain key K moves closer to the ink fountain roller 8, the gap G becomes narrower and the amount of the ink that flows out from the ink fountain 7 becomes less.

As shown in FIG. 2A, the feed roller 16 is provided so as to be pivotally movable between the ink fountain roller 8 and an ink roller 17, and is connected to the pivotally moving device 70 such that the feed roller 16 either moves closer to the ink fountain roller 8 (moves toward Z1 direction) or moves away from the ink fountain roller 8 and closer to the ink roller 17 (moves toward Z2 direction), and is configured such that the feed roller 16 can be positioned selectively either at a position approximate to the ink fountain roller 8 or at a position approximate to the ink roller 17.

In this manner, the printing ink 10 contained within the ink fountain 7 moves from the ink fountain roller 8 to the feed roller 16, and then to the ink roller 17, thereby being fed to the plate 4 via such as the group of ink rollers that is not shown in the drawings.

As described above, the printing section 30 is provided with the plurality of ink fountain keys K such that the printing inks of four colors of C, M, Y, and Bk are respectively contained in the four ink fountains 7, and that the feed amount of each ink is adjustable at each ink fountain 7 along the width direction X' of the ink fountain keys, and the inks of the plurality of basic colors, whose feed amounts are adjusted respectively for the plurality of ink fountain keys K, are fed to the four plates 4 that are respectively provided to correspond to the ink fountains 7 and respectively form the images of basic colors of C, M, Y, and Bk.

Although not shown in the drawings, the color bar, which is for controlling quality of the color print image on a surface of the printed matter Q that has been printed by the printing section 30 of the color printing press 100 in FIG. 1, is provided including four color patches and a single color gray patch at a position in the non-printing area of the printing paper P that corresponds to the position of the ink fountain keys K, that is, the patches of the number corresponding to the number of the ink fountain keys K are to be printed. The four color patches are color patches with 100% in tone values printed with C ink, M ink, Y ink, and Bk ink and formed corresponding to the images of basic colors of C, M, Y, and Bk. Further, the single color gray patch is a single gray patch that is constituted from halftone images of predetermined tone values of C, M, and Y respectively corresponding to the images of basic colors of C, M, and Y out of the images of basic colors C, M, Y, and Bk.

Then, spectral densities of the C, M, and Y components that constitute the gray patches are measured by reading the gray patches of the printed matter Q using a scanner having a spectrocolorimeter that is not shown in the drawings, and based on a spectral distribution obtained by a result of this measurement, a gray Lab value is obtained. Further, ΔL, Δa, and Δb that are differences between the measured value Lab obtained by the measurement and a target value Lab that is previously set are obtained; then Δa based on Δb out of ΔL, Δa, and Δb are corrected; and then ΔL is corrected based on a corrected value Δa1 obtained after correcting Δa. Whereby, even when tints or hues vary during printing due to the changes in the turbidity degree and the ink trapping ratio, the tints or hues are immediately corrected with high accuracy, thereby constantly matching the tints or hues of the printed matter with tints or hues of a target image of the printed matter.

A configuration of the controlling unit S, for adjusting the ink density difference by correcting ΔL and Δa that are the differences in gray between the measured value and the target value based on the value of Δb so as to match the tints or hues of the image of the printed matter with the tints or hues of the target image of the printed matter during printing, is shown by a block diagram of FIG. 3.

The controlling unit S is provided with a target value input means 11 for inputting the targeted Lab value to confirm the tint or hue of the gray of the color print image to be printed, a measurement means 12 for measuring the gray Lab value of the printed color print image, a calculation means 13 for calculating the differences respectively between the gray Lab value measured by the measurement means 12 and the gray Lab value inputted by the target value input means 11, a first correction value calculation means 14 for correcting Δa, out of three values of ΔL, Δa, and Δb that have been calculated by the calculation means 13, based on the value of Δb, a second correction value calculation means 15 for correcting ΔL based on the corrected value Δa1 that has been calculated by the first correction value calculation means 14, a halftone density difference calculation means 18 for finally calculating halftone density differences for C, M, and Y respectively based on Δb, the corrected value Δa1, and a corrected value ΔL1 obtained after the correcting ΔL, an ink density difference conversion means 19 for converting the halftone density differences in C, M, and Y calculated by the halftone density difference calculation means 18 respectively into the ink density differences, and an ink feed amount adjustment means 21 for adjusting the ink feed amounts for the plurality of ink fountain keys for each color based on the corresponding ink density differences that have been converted.

Here, various cases are conceivable as the target value input means 11, other than such a case of inputting to the controlling unit S using a keyboard and such, such as a case in which data stored in a recording medium such as a magnetic disk is read by or write into the controlling unit S, and a case in which data stored in a personal computer and such is read by or write into the controlling unit S via the Internet or using a transmission medium such as wiring.

To describe in detail, the first correction value calculation means 14 calculates the Y halftone density difference based on the value of Δb and calculates a variation amount Δa' corresponding to the calculated Y halftone density difference and the second correction value calculation means 15 converts into the M halftone density difference based on the corrected value Δa1, calculates a variation amount of the Y halftone density difference as the Y2 halftone density difference from the converted M halftone density difference, as well as to calculate a variation amount ΔL' of ΔL that varies in relation to the M halftone density difference, and calculates the corrected value ΔL1 by adding the variation amount ΔL' to ΔL.

Figure 4:
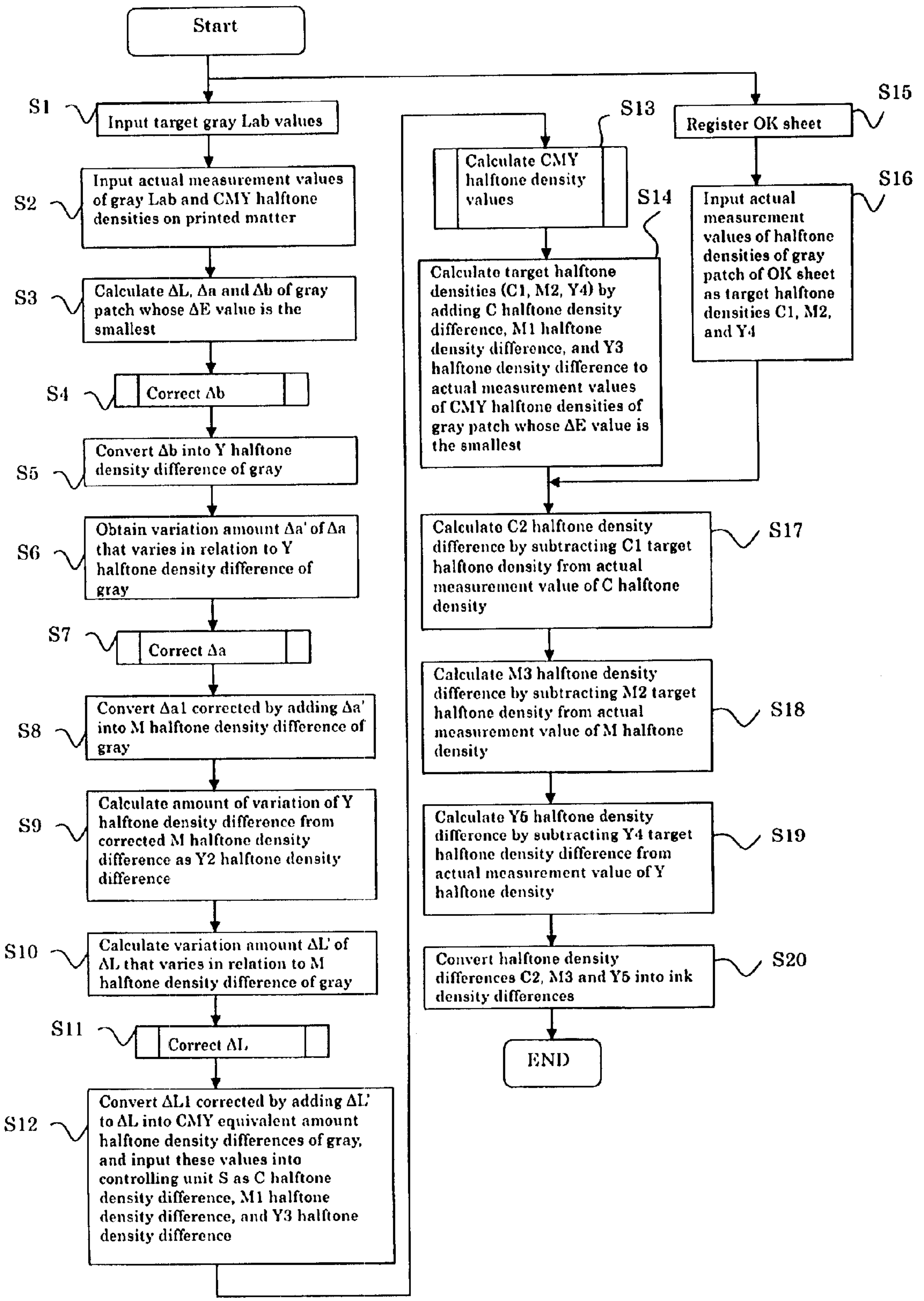
FIG. 4 is a flowchart for correcting Δa and ΔL based on Δb.

The controlling unit S corrects Δa whose difference from a target value is the second smallest, based on Δb whose turbidity degree is the smallest, that is, based on Δb whose difference from a target value is the smallest, and finally corrects ΔL. Whereby, it is possible to gradually approximate to the target printed image, specific steps of which are described with reference to a flowchart shown in FIG. 4.

First of all, the target gray Lab values (three values) are inputted into the controlling unit S (Step S1). The target gray Lab values can be Lab values that are previously selected and specified, or can be measured values when measuring a sample gray Lab value. After the three target Lab values are inputted, the gray Lab values and the C, M, and Y halftone densities of the gray patches on a printed matter (here, printing paper) after driving the printing press and printing with the printing press are measured using such as a scanner, and these six measured values are inputted into the controlling unit S (Step S2). Next, a color difference ΔE, a luminance (brightness) ΔL, Δa of red and green and Δb of yellow and blue out of tints or hues are calculated based on the differences between the target gray Lab values and measured values (actual measurement values) of Lab of the gray patches on the printed matter (sample) (Step S3). At this time, as the gray patches of the printed matter (sample) are provided as many as the number of the ink fountain keys, by selecting and measuring one of the gray patches whose ΔE value is the smallest, it is advantageously possible to approximate to the target gray Lab value, thereby realizing the correction with high accuracy.

After calculating the ΔE, ΔL, Δa, and Δb, a sub routine for correcting Δb (Step S4) starts, and Δb is converted into the Y halftone density difference of gray (Step S5). It should be noted that, while the sub routine is explained as the correction of Δb, this sub routine is actually for calculating the correction value for correcting Δa.

Figure 5A:
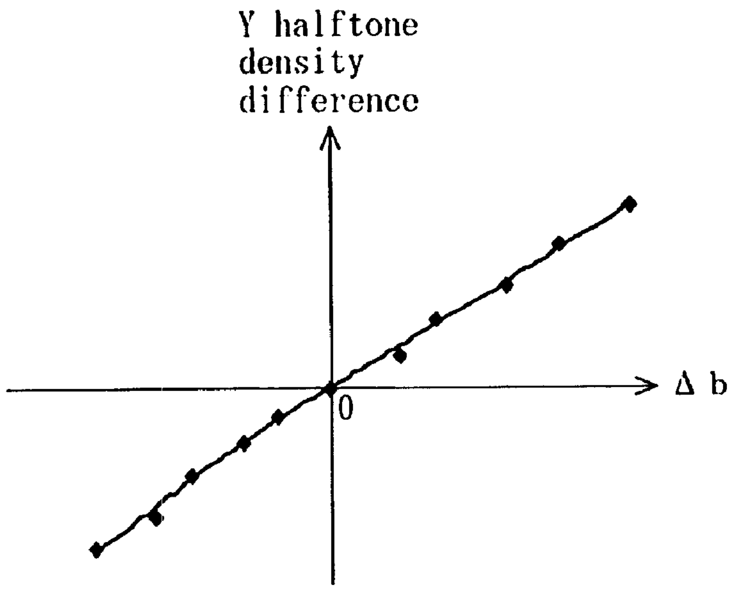
FIG. 5A is a graph showing a Y halftone density difference in relation to Δb.
Figure 5B:
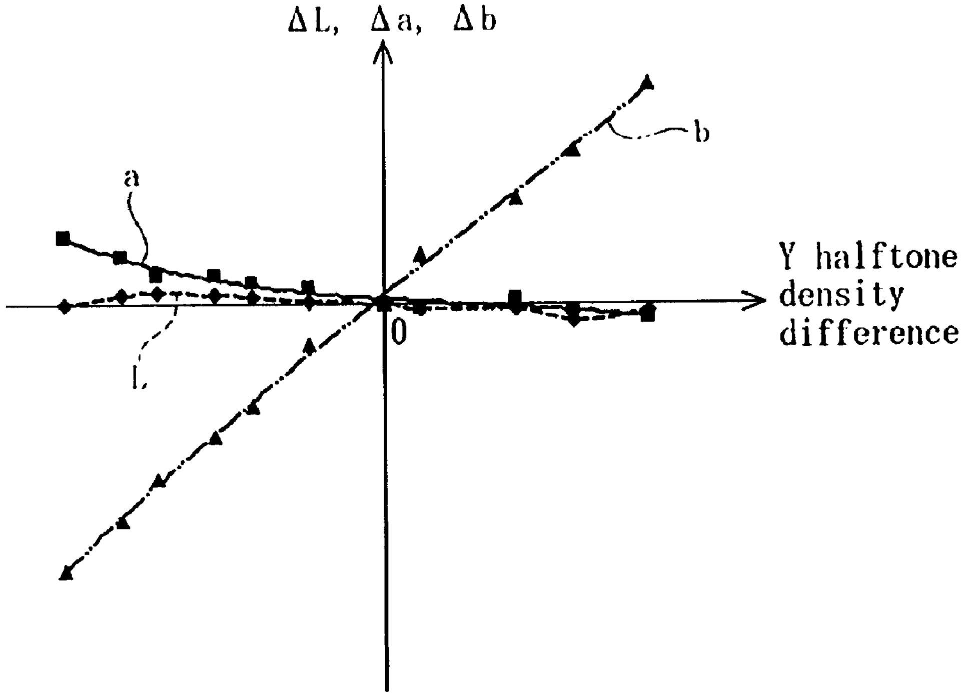
FIG. 5B is a graph showing ΔL, Δa, and Δb in relation to the Y halftone density difference.

Upon starting the sub routine for correcting Δb, Δb is converted into the Y halftone density difference of gray. In order to carry out the conversion, the Y halftone density difference can be calculated by first converting a line of a graph showing a relation between Δb and the Y halftone density difference shown in FIG. 5A into an expression, and then assigning the value of Δb into the expression. Converting Δb into the Y halftone density difference of gray indicates that Δb is corrected based on Yellow with less turbidity. Then, the variation amount Δa' of Δa that varies in relation to the calculated Y halftone density difference of gray is obtained (Step S6). The variation amount Δa' can be calculated by first converting three lines L (shown by a dashed line), a (shown by a solid line), b (shown by a two-dot chain line) of a graph showing relations between the Y halftone density difference and ΔL, Δa, and Δb shown in FIG. 5B into expressions, and then assigning the Y halftone density difference into the expressions.

Figure 6A:
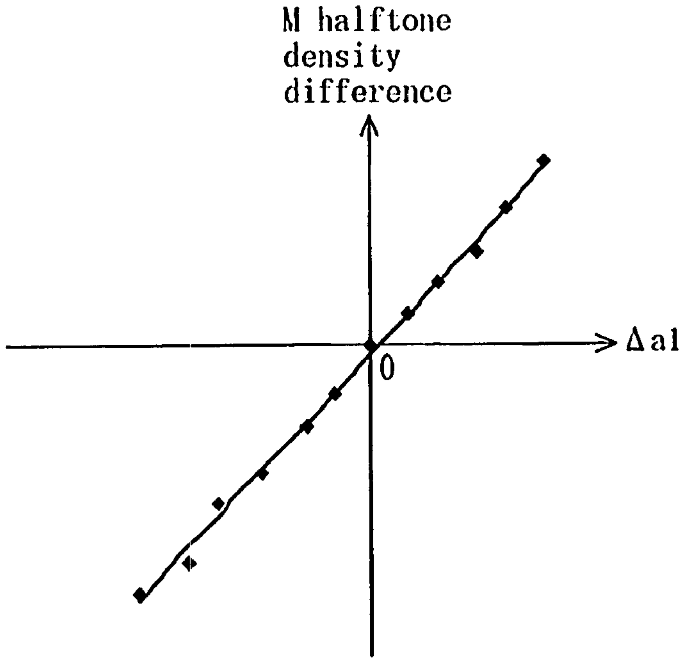
FIG. 6A is a graph showing an M halftone density difference in relation to Δa1.
Figure 6B:
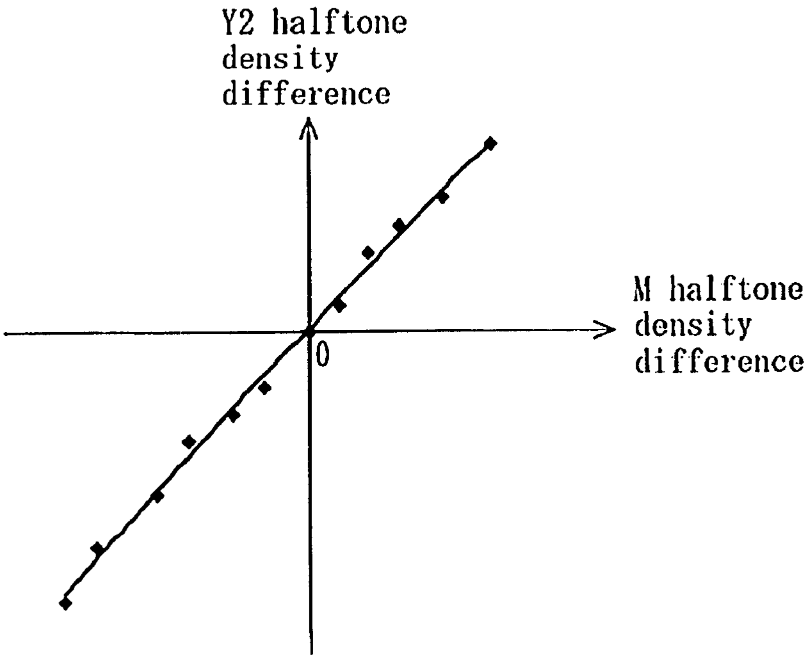
FIG. 6B is a graph showing Y2 halftone density difference in relation to the M halftone density difference.

Next, a sub routine for correcting Δa (Step S7) starts. Δa1 that has been corrected by adding the variation amount Δa' obtained in the Step S6 to Δa that has been obtained in the Step S3 is converted into the M halftone density difference of gray (Step S8). In order to carry out the conversion, the M halftone density difference can be calculated by first converting a line of a graph showing a relation between Δa1 and the M halftone density difference shown in FIG. 6A into an expression, and then assigning the value of Δa1 into the expression. Then, an amount of variation of the Y halftone density difference is calculated as the Y2 halftone density difference from the corrected M halftone density difference (Step S9). In order to carry out the calculation, the Y2 halftone density difference can be calculated by first converting a line of a graph showing a relation between the M halftone density difference and the Y2 halftone density difference shown in FIG. 6B into an expression, and then assigning the value of the M halftone density difference into the expression. In this manner, it is possible to carry out the correction without making the M halftone density difference vary greatly, by subtracting Δa+Δa', which is obtained by adding the variation amount Δa' of Δa that varies in relation to the Y halftone density difference of gray with Δb converted, from the target value Δa. Accordingly, in comparison to the technique in which an entire difference between the target Lab and the actually measured Lab is calculated and corrected at the same time, it is advantageously possible to calculate the M halftone density difference with high accuracy.

Then, the variation amount ΔL' of ΔL that varies in relation to the M halftone density difference of gray is calculated (Step S10).

Figure 7A:
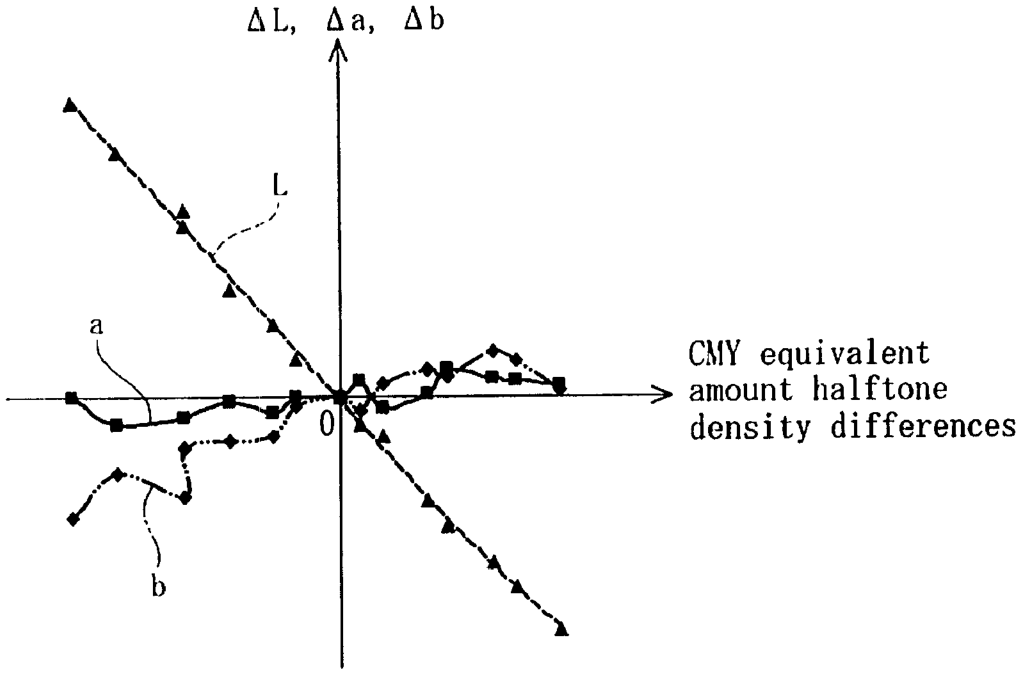
FIG. 7A is a graph showing ΔL, Δa, and Δb in relation to C, M, and Y equivalent amount halftone density differences.
Figure 7B:
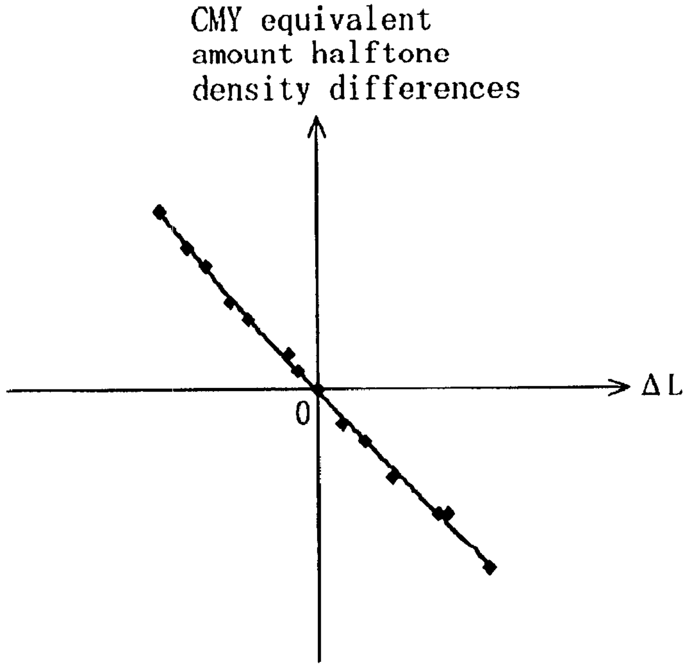
FIG. 7B is a graph showing C, M, and Y equivalent amount halftone density differences in relation to ΔL.

Next, a sub routine for correcting ΔL (Step S11) starts. In this case, ΔL1 that has been corrected by adding the calculated variation amount ΔL' to ΔL is converted into the C, M, and Y equivalent amount halftone density differences of gray, and these values are inputted into the controlling unit S as a C halftone density difference, an M1 halftone density difference, and a Y3 halftone density difference (Step S12). In order to convert ΔL1 into the C, M, and Y equivalent amount halftone density differences of gray in this manner, the values for ΔL1, Δa, and Δb are calculated by first converting a line of a graph showing a relation between the C, M, and Y equivalent amount halftone density differences and ΔL1 (shown by a dashed line), Δa (shown by a solid line), and Δb (shown by a two-dot chain line) as shown in FIG. 7A into expressions, and then assigning the C, M, and Y equivalent amount halftone density differences into the expressions. Then, the C, M, and Y equivalent amount halftone density differences can be calculated by first converting a line of a graph (shown in FIG. 7B) showing a relation between ΔL1 among the above calculated values and the C, M, and Y equivalent amount halftone density differences, into expressions, and then assigning ΔL1 into the expressions.

Thereafter, the step proceeds to a sub routine for calculating the C, M, and Y equivalent amount halftone density differences (Step S13). At this time, the target halftone densities C1, M2, and Y4 are calculated by selecting one of the gray patches whose ΔE value is the smallest in the same manner as described above, measuring the C, M, and Y halftone densities of the gray patch, and adding the C halftone density difference, the M1 halftone density difference, and the Y3 halftone density difference obtained in the Step S12 to the actual measurement values (Step S14). Further, the target halftone densities C1, M2, and Y4 of the gray patches can be inputted in such a manner that an operator previously prints and carries out color matching, and registers a resulting OK sheet to the controlling unit S (Step S15); the actual measurement values of the halftone densities of the OK sheet are inputted as the target halftone densities C1, M2, and Y4 (Step S16). Accordingly, the step proceeds to the next operation using one of the two pieces of the input data.

The halftone density differences C2, M3, and Y5 are calculated from the input data C1, M2, and Y4 and the actual measurement values C, M, and Y of the C, M, and Y halftone densities that have been obtained by measuring the C, M, and Y halftone densities of the printed matter that has been printed. Specifically, the halftone density difference C2 is calculated by subtracting the C1 target halftone density from the actual measurement value of the C halftone density (Step S17), then the halftone density difference M3 is calculated by subtracting M2 target halftone density from the actual measurement value of the M halftone density (Step S18), and finally, the halftone density difference Y5 is calculated by subtracting Y4 target halftone density difference from the actual measurement value of the Y halftone density (Step S19). The calculation of these three halftone density differences C2, M3, and Y5 can be carried out in any order.

After calculating the three halftone density differences C2, M3, and Y5 (feedback amount), these three values are respectively converted into the ink density differences (Step S20) to complete the correction, and the ink feed amounts are adjusted by the ink feed amount adjustment means 21 based on these three ink density differences. A graph for converting the three halftone density differences C2, M3, and Y5 respectively into the ink density differences is not given.

This specification is by no means intended to restrict the present invention to the preferred embodiments set forth therein. Various modifications to the method and apparatus of controlling quality of printed image for color printing press, as described herein, may be made by those skilled in the art without departing from the spirit and scope of the present invention as defined in the appended claims.

What is claimed is:

1. A method of controlling quality of a printed image of a color printing press that prints a color print image on a subject to be printed by: adjusting ink feed amounts from a plurality of ink fountains using a plurality of ink fountain keys, the ink fountains respectively containing printing inks of a plurality of basic colors that are different from each other; supplying the inks of basic colors that have been adjusted for the corresponding ink fountain keys to a plurality of printing plates provided corresponding to the plurality of ink fountains; and sequentially printing a plurality of images of the basic colors on the subject to be printed, the images being formed respectively with the supplied inks of the plurality of basic colors, the method comprising the steps of:

measuring gray Lab values of a printed matter that has been printed;

calculating ΔL, Δa, and Δb that are respectively differences between the measured Lab values and predetermined target gray Lab values;

correcting Δa based on Δb;

thereafter correcting ΔL based on a corrected value Δa1 of Δa;

calculating C, M, and Y halftone density differences, respectively, based on Δb, the corrected value Δa1 and a corrected value ΔL1 obtained by correcting ΔL;

converting the calculated C, M, and Y halftone density differences into ink density differences, respectively; and adjusting the ink feed amounts for the corresponding plurality of ink fountain keys based on the converted ink density differences;

wherein:

the correction of Δa is carried out by converting Δb into a Y halftone density difference for gray, and calculating a variation amount Δa' of Δa that has varied due to the conversion, the correction of ΔL is carried out by obtaining the corrected value Δa1 by adding the variation amount Δa' to Δa, and converting the corrected value Δa1 into an M halftone density difference for gray, the calculation of C, M, and Y halftone density differences is carried out by calculating a variation amount ΔL' of the Y halftone density difference and ΔL that have varied due to the conversion, obtaining the corrected value ΔL1 by adding the variation amount ΔL' to ΔL, converting the corrected value ΔL1 into C, M, and Y equivalent amount halftone densities for gray, setting the converted C, M, and Y equivalent amount halftone densities as C, M, and Y halftone density differences, calculating target halftone density values by adding actual measurement values of the C, M, and Y halftone densities to the C, M, and Y halftone density differences, and calculating the C, M, and Y halftone density differences by subtracting the target halftone density values from the actual measurement values of the C, M, and Y halftone densities, and the calculated C, M, and Y halftone density differences are converted into the ink density differences.

2. An apparatus of controlling quality of a printed image of a color printing press that includes a plurality of ink fountains respectively containing printing inks of a plurality of basic colors that are different from each other and a plurality of ink fountain keys for adjusting ink amounts fed from the corresponding ink fountains, and that prints a color print image on a subject to be printed by supplying the inks of basic colors, whose feed amounts have been adjusted for the corresponding ink fountain keys, to a plurality of printing plates provided corresponding to the plurality of ink fountains; and sequentially printing a plurality of images of the basic colors on the subject to be printed, the images being respectively with the supplied inks of the plurality of basic colors, the apparatus comprising:

a controlling unit that is provided with:

measurement means that measures gray Lab values of a printed matter that has been printed;

calculation means that calculates ΔL, Δa, and Δb that are respectively differences between the Lab values measured by the measurement means and predetermined target gray Lab values;

first correction value calculation means that corrects Δa based on Δb;

second correction value calculation means that corrects ΔL based on a corrected value Δa1 that has been calculated by the first correction value calculation means;

halftone density difference calculation means that calculates C, M, and Y halftone density differences, respectively, based on Δb, the corrected value Δa1 and a corrected value ΔL 1 obtained by correcting ΔL;

ink density difference conversion means that converts the C, M, and Y halftone density differences calculated by the calculation means into ink density differences, respectively; and ink feed amount adjustment means that adjusts the ink feed amounts for the corresponding plurality of ink fountain keys based on the converted ink density differences;

wherein;

the first correction value calculation means converts Δb into a Y halftone density difference for gray, calculates a variation amount Δa' of Δa that has varied due to the conversion, and calculates the corrected value Δa1 by adding the variation amount Δa' to Δa, the second correction value calculation means converts the corrected value Δa into an M halftone density difference for gray, calculates a variation amount ΔL' of the Y halftone density difference and ΔL that have varied due to the conversion, and calculates the corrected value ΔL1 by adding the variation amount ΔL' to ΔL, and the halftone density difference calculation means converts the corrected value ΔL1 into C, M, and Y equivalent amount halftone densities for gray, sets the converted C, M, and Y equivalent amount halftone densities as C, M, and Y halftone density differences, calculates target halftone density values by adding actual measurement values of the C, M, and Y halftone densities to the C, M, and Y halftone density differences, and calculates the C, M, and Y halftone density differences by subtracting the target halftone density values from the actual measurement values or the C, M, and Y halftone densities.

* * * * *